March 18, 1941.    E. M. ENKUR    2,235,101

VENTING MEANS FOR SEALED CONTAINERS

Filed May 29, 1939

Inventor:
Edward M. Enkur,
By Cushman Darby & Cushman
Attorneys

Patented Mar. 18, 1941

2,235,101

UNITED STATES PATENT OFFICE 2,235,101

VENTING MEANS FOR SEALED CONTAINERS

Edward M. Enkur, Baltimore, Md., assignor to Crown Cork & Seal Company, Inc., Baltimore, Md., a corporation of New York Application May 29, 1939, Serial No. 276,479

2 Claims. (Cl. 51—56)

This invention relates to sealed containers and has as its object to provide simple means whereby abnormally high pressures may be vented.

In the packaging of many products in sealed containers, the very real problem arises of providing venting means, particularly where the containers are of glass, or like material, which will rupture with dangerous results under high pressures generated in the containers.

The present invention contemplates the use with a container sealed by a suitable closure, of means interposed between the closure and the container lip providing a minute channel through which abnormally high pressures may escape. The channel provided is so small as to resist the escape of normal pressures and as to prevent breathing under normal conditions, and consequently the invention may be utilized in the packaging of materials susceptible of injury upon contact with air.

In the accompanying drawing I have shown the invention in practical and illustrative embodiment, and I shall proceed with a description of the invention with reference to this drawing, in which.

Figure 1:
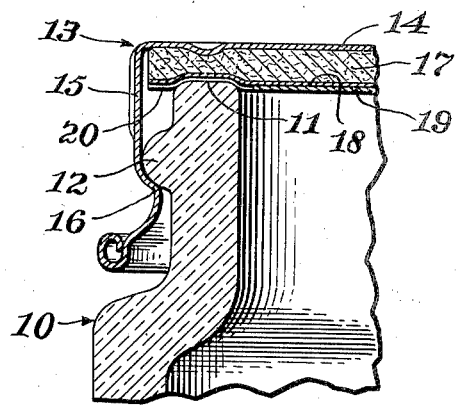
Figure 1 is a partial axial section of a container and closure provided with the venting means of the present invention.

Referring to the drawing, and first to Figures 1 to 4, reference numeral 10 designates the upper portion of a container, here contemplated as being of glass or similar material. The mouth of the container is surrounded by a lip 11, and below the lip the container is provided with external locking lugs as at 12. The cap, designated generally by the reference numeral 13, comprises a circular top 14 and a depending skirt 15 provided with lugs as at 16 for interengagement with the container lugs 12. The nature of these interengaging means is immaterial, so far as the present invention is concerned, so long as they are of a nature as to exert an axial tension on the skirt of the applied cap. For example, the container and cap may have coacting screw threads or may be formed for snap-on engagement, or they may be interengaged in the manner of the ordinary crown cap and container, etc.

Figure 2:
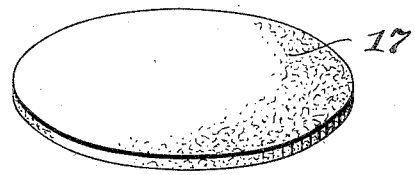
Figure 2 is a perspective of a compressible packing element or gasket forming a part of the closure.

The cap is provided with the usual packing element or gasket designated in Figures 1 and 2 by the reference numeral 17. In the present instance, it is assumed that the element 17 is of material, such as pulp board, which is affected by moisture, and consequently, the exposed surface of element 17 is shown as having applied thereto a facing disc 18 of impervious and inert substance. When the packing element 17 is composed of material unaffected by moisture, for example, rubber, the facing element 18 may be omitted. On the other hand, the facing element may consist of an impervious coating applied to the lower face of the packing.

Interposed between gasket 17, whether the latter is faced or not, is a disc 19 of relatively hard material, this disc being here shown as being of the same size as the facing element 18. Disc 19 is provided in its marginal portion with a slit 20 which, as here shown, is straight and substantially radially arranged. However, the form of the slit may be as desired so long as when the disc is applied in the manner shown in Figure 1 the slit extends across the lip 11 from the inside to the outside of the latter.

With the cap applied to the container as in Figure 1, the packing element or gasket is compressed between the top of the cap and the container lip in the usual manner. However, the slit 20 provides a minute channel across the container lip through which abnormal pressures may vent, it being understood that the vented gases can escape readily between the cap skirt and the container.

In practice, I have made the disc 19 of various materials, of which a vinylite film is an example, which material may be readily regulated as to hardness. The slit may be merely a cut, with no material removed, or it may be formed by the removal of a very narrow strip of material. The cut has been found, however, to be entirely adequate, and if desired, more than one may be provided. With a hard vinylite film, for example, the cut is adequate, since when pressure is exerted, the edges of the cut will not be squeezed together so as to seal. With a softer film, where the edges of a mere cut might be squeezed together to form a seal, the slit is made wider so that a minute passage will exist after the application of the cap. The point is that depending upon the material and the sealing pressures to be used, a suitable slit is provided so that a minute channel will be maintained when the cap is applied to the container in sealing relation.

Vinylite film is mentioned merely as an example of a suitable material for the venting disc. Metal foils or any other suitable materials may be used.

Figure 3:
Figure 3 is a perspective of a sealing facing element for the packing.
Figure 4:
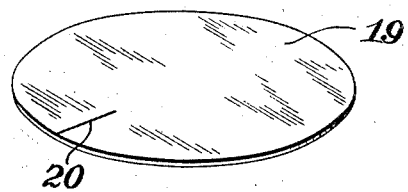
Figure 4 is a perspective of a venting disc provided in its marginal portion with a venting slit.
Figure 5:
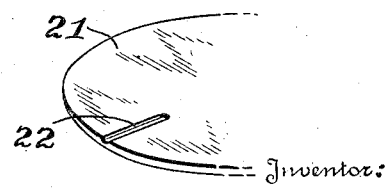
Figure 5 is a perspective, bottom view, of a venting disc provided in its marginal portion with a venting score.

In Figure 5, the venting disc 21 is shown as being somewhat thicker than the venting disc 18 of Figures 1 and 3, and in this case is provided on its lower marginal surface with a score or groove 22 which will provide the minute escape passage in use.

In referring to elements 19 and 21 as discs, I do not confine myself to a solid disc, since an annular or other form might be used, it being only necessary that sufficient area be present to overlie the container lip and to present a minute channel of proper length and disposition.

It will be understood that variations in detail may be made from the disclosures herein without departure from the invention as defined in the following claims.

I claim:

1. The combination with a container and closure, the container having a mouth defined by a top circumferential lip and the closure having a gasket overlying said lip, the container and closure having interengaging means whereby the closure is held on the container with the gasket in compressed condition, of a disc of relatively uncompressible material interposed between the gasket and the container lip and provided with a minute channel crossing from the inside to the outside of the lip, said channel serving to vent abnormal pressures within the container.

2. The combination with a container and closure, the container having a mouth defined by a top circumferential lip and the closure having a gasket overlying said lip, the container and closure having interengaging means whereby the closure is held on the container with the gasket in compressed condition, of a disc of relatively uncompressible material interposed between the gasket and the container lip and provided with a slit forming a minute channel crossing from the inside to the outside of the lip, said channel serving to vent abnormal pressures within the container.

EDWARD M. ENKUR.